US009379562B2

(12) United States Patent
Huang et al.

(10) Patent No.: US 9,379,562 B2
(45) Date of Patent: Jun. 28, 2016

(54) HOLDING ASSEMBLY FOR PORTABLE ELECTRONIC DEVICE

(71) Applicant: Chiun Mai Communication Systems, Inc., New Taipei (TW)

(72) Inventors: Chun-Ta Huang, New Taipei (TW); Kuan-Chung Shih, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 143 days.

(21) Appl. No.: 14/265,543

(22) Filed: Apr. 30, 2014

(65) Prior Publication Data

US 2014/0327392 A1    Nov. 6, 2014

(30) Foreign Application Priority Data

May 6, 2013   (TW) ............... 102116047 A

(51) Int. Cl.
*H02J 7/00*  (2006.01)
*H02J 7/02*  (2016.01)

(52) U.S. Cl.
CPC ............... *H02J 7/0044* (2013.01); *H02J 7/025* (2013.01)

(58) Field of Classification Search
CPC ....... H02J 7/025; H02J 7/0044; H02J 7/0045; H02J 7/0042; H01F 38/14; Y02T 90/122; B60L 11/182; Y02E 60/12; H01M 10/46
USPC ....................................................... 320/108
See application file for complete search history.

(56) References Cited

U.S. PATENT DOCUMENTS

| 7,683,572 | B2 * | 3/2010 | Toya | H02J 7/0044 320/108 |
| 7,715,187 | B2 * | 5/2010 | Hotelling | G06F 1/1632 248/371 |
| 8,624,547 | B2 * | 1/2014 | Thorsell | B60N 3/002 320/107 |
| 2010/0244767 | A1 * | 9/2010 | Turner | H02J 7/025 320/108 |
| 2010/0315041 | A1 * | 12/2010 | Tan | H02J 7/0044 320/115 |
| 2011/0018499 | A1 * | 1/2011 | Fujiwara | H01M 10/46 320/108 |
| 2012/0169276 | A1 * | 7/2012 | Wang | H02J 7/0042 320/108 |

FOREIGN PATENT DOCUMENTS

| EP | 2472697 A1 | 7/2012 |
| JP | 2000339087 A | 12/2000 |
| WO | 2010150436 A1 | 12/2010 |

* cited by examiner

Primary Examiner — Arun Williams
(74) Attorney, Agent, or Firm — ScienBiziP, P.C.

(57) ABSTRACT

Holding assembly for a portable electronic device includes a base, a holder, and a charging unit. The holder is pivotably coupled to the base and supports the portable electronic device. The charging unit includes a radio frequency (RF) transmission module and a RF receiving module. The RF transmission module is coupled to the holder, the RF receiving module is integrated with the portable electronic device. The RF receiving module communicates with the RF transmission module via electromagnetic induction to charge the portable electronic device.

8 Claims, 6 Drawing Sheets

HOLDING ASSEMBLY FOR PORTABLE ELECTRONIC DEVICE

FIELD

This disclosure relates to holding assembles for portable electronic devices, and particularly to a holding assembly used for charging portable electronic devices.

BACKGROUND

Many people carry portable electronic devices, such as tablet computers and mobile phones. The portable electronic devices often need to be supported by a holder to read an eBook or to watch a video, and power of the tablet computer is used up quickly.

BRIEF DESCRIPTION OF THE DRAWINGS

Many aspects of the holding assembly can be better understood with reference to the following drawings. The components in the drawings are not necessarily drawn to scale, the emphasis instead being placed upon clearly illustrating the principles of the holding assembly.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
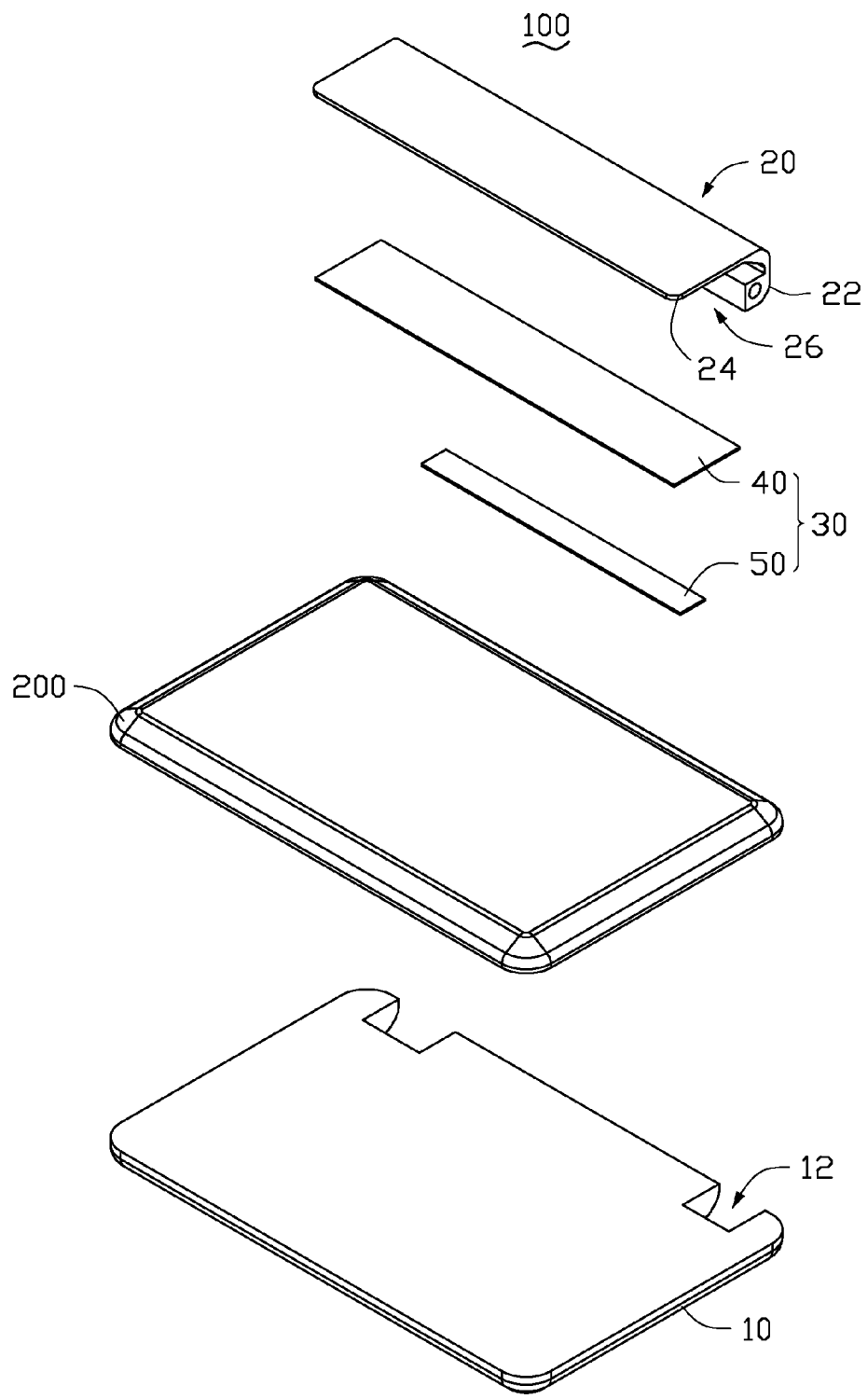
FIG. 1 is an exploded, isometric view of a holding assembly for a portable electronic device, according to a first exemplary embodiment.
Figure 2:
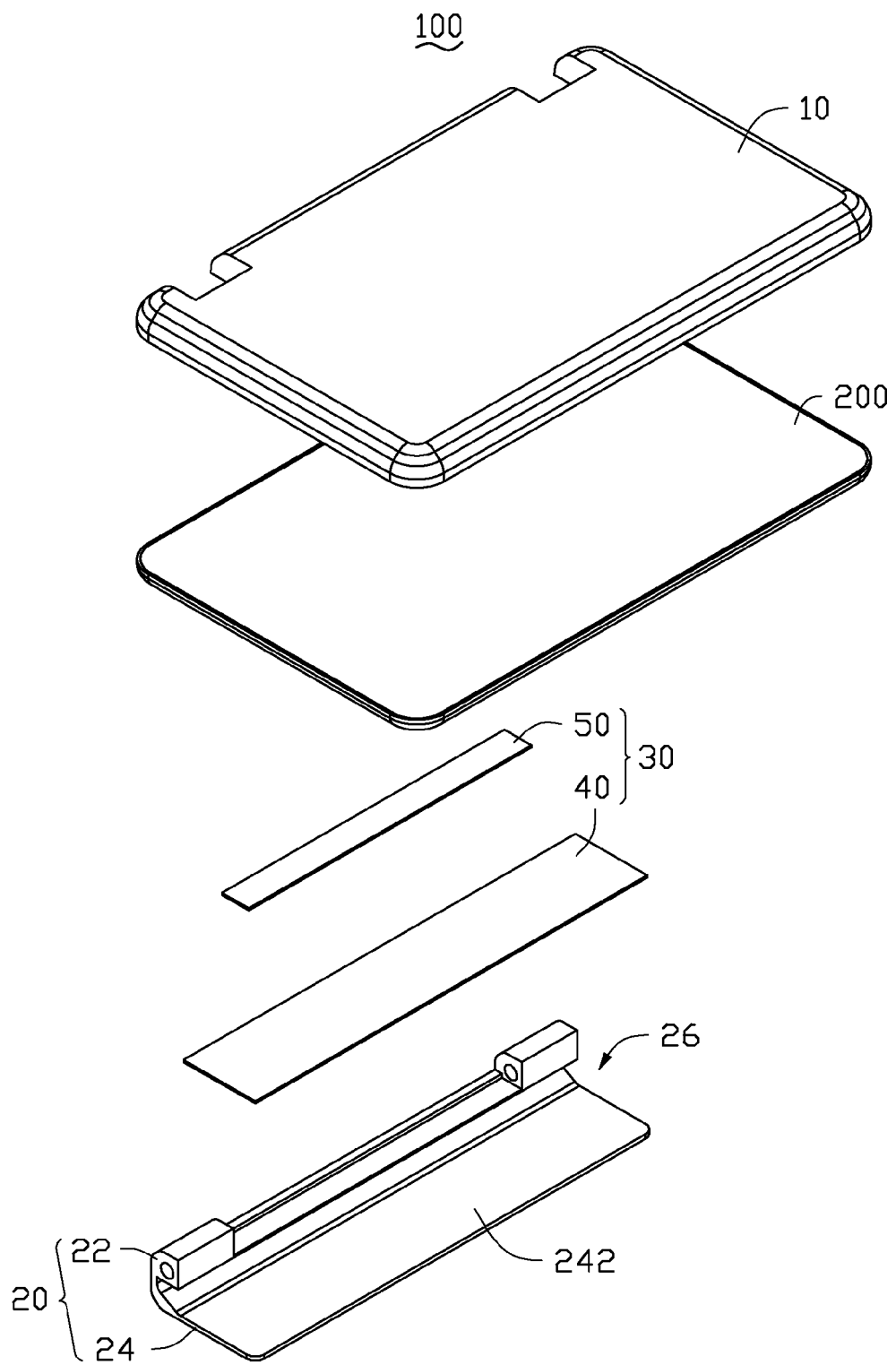
FIG. 2 is similar to FIG. 1, but shown from another angle.

FIGS. 1 and 2 illustrate a holding assembly 100 used for supporting and charging a portable electronic device 200, according a first exemplary embodiment. In the first exemplary embodiment, the portable electronic device 200 is a tablet computer, but the disclosure is not limited thereto.

The holding assembly 100 includes a base 10, a holder 20, and a charging unit 30.

The base 10 is substantially a rectangular member. One side of the base defines two notches 12 for mounting the holder 20.

The holder 20 is pivotably coupled to the base 10, for supporting the portable electronic device 200. The holder 20 includes two hinge barrels 22 and a support plate 24. The two hinge barrels 22 are received in the two notches 12, respectively, and are rotatably coupled to the base 10 via a hinge (not shown). The support plate 24 is coupled to a same side of the two hinge barrels 22 at an angle. Thus, a receiving space 26 is defined between the support plate 24 and the two hinge barrels 22, for receiving the portable electronic device 200. The support plate 24 includes an inner surface 242, and the inner surface 242 is opposite the two hinge barrels 22.

The charging unit 30 charges the portable electronic device 200 via electromagnetic induction. The charging unit 30 includes a radio frequency (RF) transmission module 40 and a RF receiving module 50. The RF transmission module 40 is detachably coupled to the inner surface 242 of the support plate 24. The RF receiving module 50 is integrated at internal of the portable electronic device 200.

Figure 3:
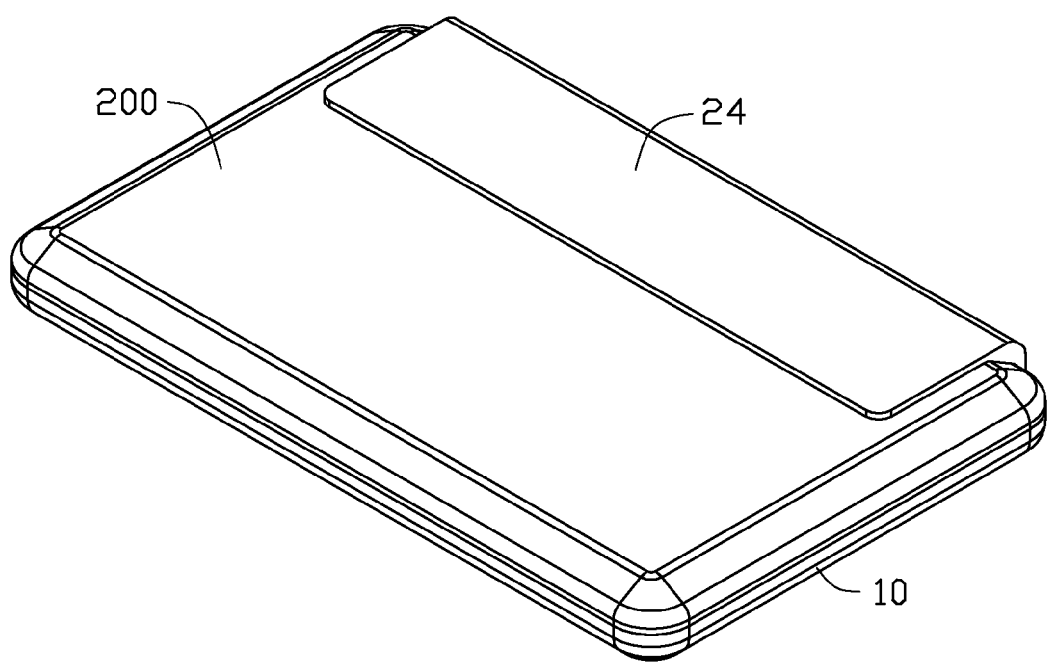
FIG. 3 is an assembled, isometric view of the holding assembly of FIG. 1 in a closed state.
Figure 4:
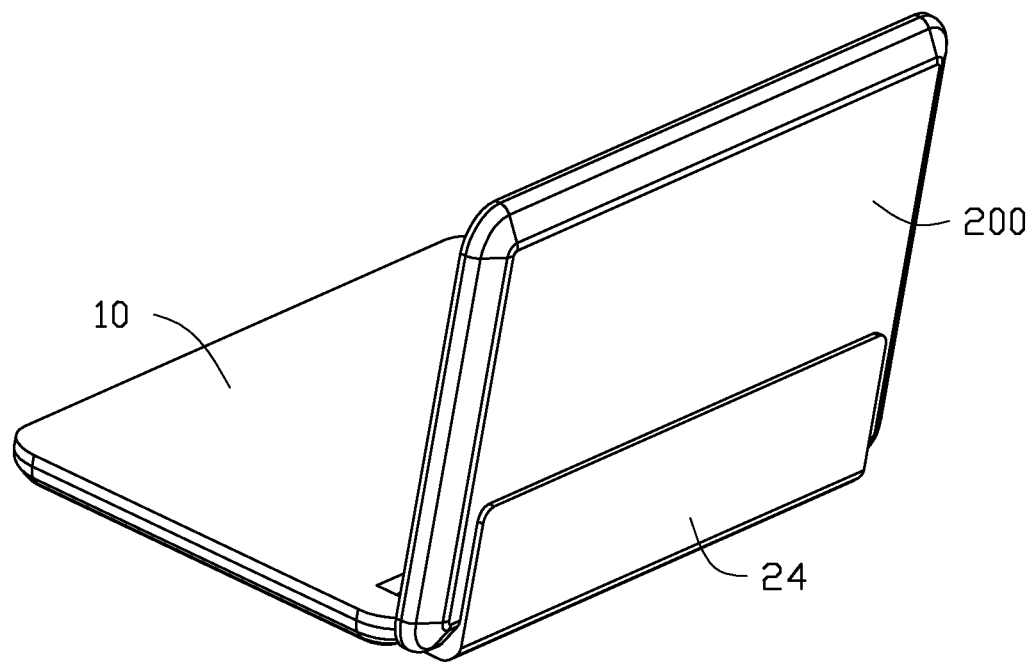
FIG. 4 is an assembled, isometric view of the holding assembly of FIG. 1 in a open state.

FIGS. 3 and 4 illustrate that in use the holder 20 is pivoted to the base 10 via the two hinge barrels 22, and the portable electronic device 200 is received in the receiving space 26 and is supported by the support plate 24. Thus, the portable electronic device 200 can be closed or opened relative to the base 10. When the portable electronic device 200 is used, the holder 20 is rotated by an external force to drive the portable electronic device 200 to rotate, and thus the portable electronic device 200 can be supported at an angle relative to the base 10. When the portable electronic device 200 is not used, the holder 20 is rotated to allow the portable electronic device 200 to be sandwiched between the support plate 24 and the base 10, or the portable electronic device 200 can be taken out from the receiving space 26.

Figure 5:
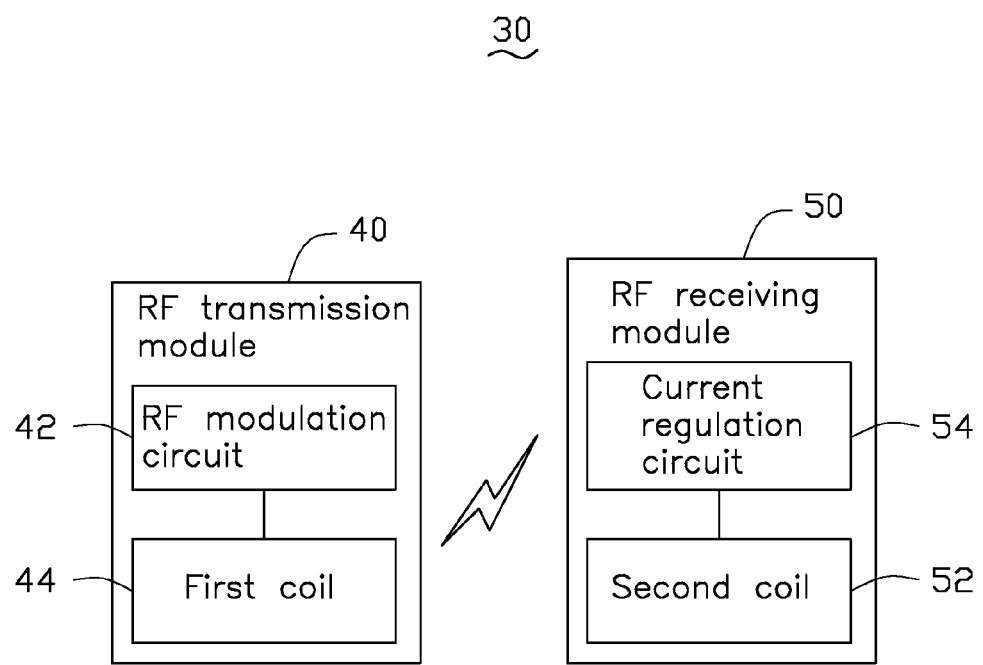
FIG. 5 is a circuit block diagram of the holding assembly of FIG. 1.

FIG. 5 illustrates that the RF transmission module 40 includes a RF modulation circuit 42 and a first coil 44 electronically coupled to the RF modulation circuit 42. The RF modulation circuit 42 outputs RF signals, and the first coil 44 sends the RF signals to the RF receiving module 50. The RF receiving module 50 includes a second coil 52 and a current regulation circuit 54. In the first exemplary embodiment, the second coil 52 is located adjacent to a display (not shown) of the portable electronic device 200, and the current regulation circuit 54 is electronically coupled to a battery (not shown) of the portable electronic device 200. The second coil 52 receives the RF signals via electromagnetic induction, thereby generating current. The current regulation circuit 54 regulates the current output from the second coil 52 for charging the battery of the portable electronic device 200.

In addition, when the portable electronic device 200 is received in the receiving space 26, the RF transmission module 40 can communicate with the RF receiving module 50. Thus, the portable electronic device 200 can be charged. Since the charging unit 30 can charge the portable electronic device 200 via electromagnetic induction, no ports or connectors of the portable electronic device 200 are needed.

Figure 6:
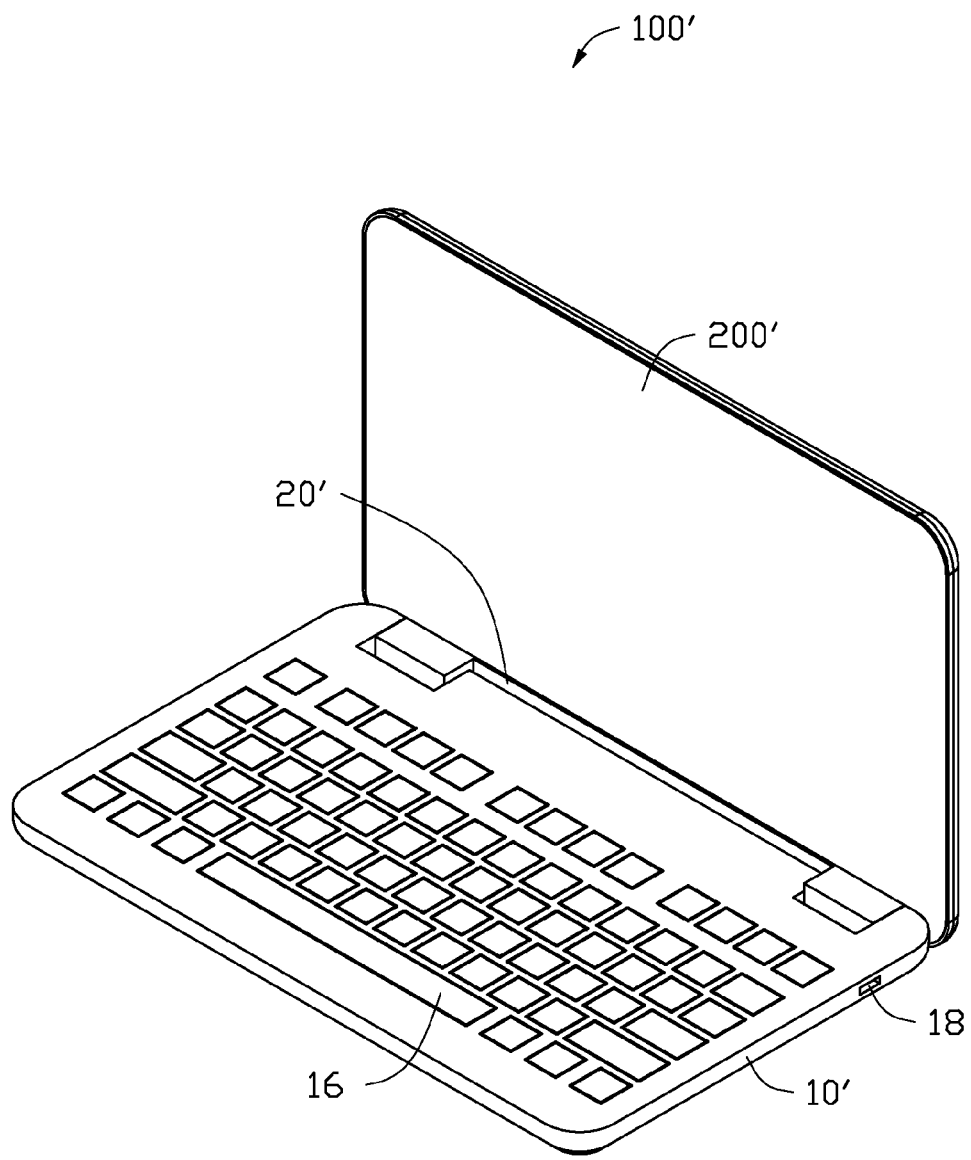
FIG. 6 is an assembled, isometric view of a holding assembly, according to a second exemplary embodiment.

FIG. 6 illustrates a holding assembly 100' used for supporting and charging a portable electronic device 200', according to a second exemplary embodiment. In the second exemplary embodiment, a keyboard 16 and a connector 18 are formed on the base 10', and the connector 18 is electronically coupled to the keyboard 16 and a port (not shown) of the portable electronic device 200'. Thus, the portable electronic device 200' can be controlled by the keyboard 16.

In summary, the portable electronic device 200, 200' can be supported by the base 10, 10' and the holder 20, and can also be charged by the charging unit 30. Thus, the holding assembly 100, 100' is both convenient and efficient.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A holding assembly for a portable electronic device, the holding assembly comprising:
   a base;
   a holder comprising a support plate pivotably coupled to the base and configured to allow the portable electronic device to be sandwiched between the support plate and the base; and
   a charging unit comprising a radio frequency (RF) transmission module and a RF receiving module;
   wherein the RF transmission module is coupled to the holder; the RF receiving module is integrated with the portable electronic device; and the RF receiving module communicates with the RF transmission module via electromagnetic induction to charge the portable electronic device.

2. The holding assembly as recited in claim 1, wherein the base defines two notches, the holder comprises two hinge barrels, the two hinge barrels are received in the two notches, respectively, and are rotatably coupled to the base.

3. The holding assembly as recited in claim 2, wherein the support plate is coupled to the two hinge barrels at an angle.

4. The holding assembly as recited in claim 3, wherein a receiving space is defined between the support plate and the two hinge barrels, the portable electronic device is received in the receiving space.

5. The holding assembly as recited in claim 4, wherein the support plate comprises an inner surface opposite to the two hinge barrels, and the RF transmission module is coupled to the inner surface of the support plate.

6. The holding assembly as recited in claim 5, wherein the RF transmission module comprises a RF modulation circuit and a first coil electronically coupled to the RF modulation circuit, the RF modulation circuit outputs RF signals, and the first coil sends the RF signals to the RF receiving module.

7. The holding assembly as recited in claim 6, wherein the RF receiving module comprises a second coil and a current regulation circuit;
   the second coil receives the RF signals via electromagnetic induction and generates current; and
   the current regulation circuit regulates the current for charging the portable electronic device.

8. The holding assembly as recited in claim 1, wherein the portable electronic device is a tablet computer.

\* \* \* \* \*